Patented Sept. 22, 1936

2,054,815

UNITED STATES PATENT OFFICE 2,054,815

COLD MOLDING COMPOSITION

Clarence A. Herbst, Chicago, Ill., assignor to Economy Fuse and Manufacturing Co., Chicago, Ill., a corporation of New York No Drawing. Application May 9, 1934, Serial No. 724,829

5 Claims. (Cl. 106—31)

This invention relates to a novel process of producing a composition of matter adapted for cold molding and the improved molded articles produced by said process.

An object of this invention is to provide a process, the practice of which results in the production of improved cold molded articles, particularly characterized for their smooth, shiny, nice appearing finish and their sharp, clean cut, defining edges and further for their easy removability from the dies without tendency to stick or adhere to the mold surface.

A further object of this invention is to provide molded articles of the above described type which possess the additional advantageous property of having a greater specific gravity which makes for greater dielectric strength, and as far as the applicant is aware, the improved finish and good appearance above referred to.

A further object of this invention is to provide a novel process which is highly efficient and relatively cheap in practice, and is productive of highly successful results without the exercise of unusual skill.

Various other objects not specifically enumerated are contemplated for this invention as will readily appear to one skilled in the art as the following description, of one illustrative embodiment of the invention, proceeds.

Heretofore, articles of commercial value and utility have been produced by processes including a cold molding operation and it is known that articles of this type may be produced by employing solutions of certain known solid binding materials and suitable filling materials admixed therewith. Such mixtures are subsequently molded to shape and finally heat-treated in a manner to render them hard and infusible in their final form.

Prior to this invention the usual practice has been to select the desired solid binding material which may be either an asphalt, stearine pitch, natural gums, synthetic and natural resins or any other similar substance subject to cold molding operations, and to produce with the substance so selected, a solution by employing a solvent selected according to its properties, its price or other commercial factors.

Solutions so formed are then mixed with the desired quantity of a suitable filling material while the entire mixture is subjected to elevated temperatures for the purpose of maintaining the mix in a relative fluid condition to enhance the intimate mixture of the components. The mixed mass is then subjected to a cooling process during which time a large portion of the solvent which has not already escaped during the mixing operation, passes off and after which the mass is disintegrated in a suitable disintegrator.

The mix, in this form, is then molded and subsequently heat-treated. In those instances where the molded articles displayed a tendency to stick to the molds it was customary to introduce, just prior to the molding operation, a suitable agent to serve as a lubricant.

Whereas the known processes have been practiced with varying degrees of success, it is now found that superior articles can be produced, namely those having a higher dielectric strength and a smoother and more finished appearance, when steps are taken during the mixing operation to produce a higher degree of impregnation of the filling material with the binding material. Accordingly, it has been discovered that, if a substantial part of the mixing operation is conducted upon the mass or mixture while it is in a relatively non-plastic condition, that is, to a considerable degree, less fluid than in processes heretofore practiced, that the higher mechanical force exerted upon the mass in the accomplishment of the mixing operation produces a high degree of impregnation making for the greater specific gravity and tenacity characterizing the improved articles above referred to.

It is well-known that the fluidity of the mixture at this time is based upon two factors, namely, the thermoplastic property of the binding materials employed and the dissolving effect of the solvent employed.

It is also well-known that in order to commence the mixing operation, the components must be brought together while the solution of binding material is in a relatively fluid condition as this is required to produce a uniform distribution of one into the other.

Consequently, in practicing the present invention, it is desirable to effect the initial admixture while the mass remains relatively fluid or highly plastic, but, after thorough admixture is obtained, to cause the mixture to become, as rapidly as possible, very much more viscous or relatively non-plastic in consistency.

According to this invention this is accomplished by the employment of an agent which is added to the product and which, under the influence of applied heat, acts to remove the solvent and produce the desired non-plastic condition, even though the thermo-plastic property of the binding material causes it to remain in a less viscous condition under the exposure to elevated temperature.

This process has particular usefulness when employed with binding material of melting point sufficiently high to cause the necessary thickening upon the loss of a substantial portion of the solvent.

For convenience, the agent referred to is herein termed an impregnating agent. This agent may be introduced at the commencement of the mixing operation, whereupon it is found that it will serve to speed up the removal of the solvent with the result that the desired relatively nonplastic condition is produced.

In applicant's Patent No. 1,966,094 for "Improvements in cold molded articles and process of producing same", there is described and claimed a process for accomplishing the same beneficial results produced by this invention. However, the process of that invention involves the removal of solvent by means of an impregnating agent which is of higher boiling point than the solvent employed together with being insoluble and immiscible in the solvent, and incapable of dissolving the binding material. Whereas the essential operating principle of that invention is the removal of the solvent and the resulting production of a more viscous mass during the mixing operation, and in this regard is the same as this present invention, the method of removing the solvent is there entirely different from the process and is based upon the use of an impregnating agent having a boiling point higher than the boiling point of the solvent, and the utilization of mixing temperatures within the range between the boiling points of the solvent and agent. In other words, the mixing temperature which removes the impregnating agent, necessarily also removes the solvent but with an effect upon the final product which could not be obtained without the agent, irrespective of the temperature employed.

As distinguished from the invention of applicant's Patent No. 1,966,094, the present invention is restricted to the use of water as the impregnating agent, together with solvents of the class known as mineral solvents having a boiling point above the boiling point of water. In this invention the removal of the solvent is accomplished in accordance with the well-known principle involved in "steam distillation" by which liquids of the mineral solvent group having higher boiling points than water are capable of being removed along with the steam or water vapor when steam or water vapor emanates therefrom or is passed therethrough.

This principle is well understood, and it is known that when, for instance, a mixture of water and mineral solvent having a boiling point higher than water, say between 300° F. and 400° F., is brought to distillation temperature, the mineral solvent will be vaporized and carried off with the steam or water vapor. When the water and mineral solvent are mixed in substantially equal proportions, it is found that such solvents will come off with the steam or vapor in proportions substantially as indicated on the following chart, which shows solvents of different boiling ranges.

| Boiling point of solvents | Percentage of water | Percentage of solvent |
| --- | --- | --- |
| 200° F. to 300° F. | 24 | 76 |
| 300° F. to 400° F. | 53 | 47 |
| 400° F. to 525° F. | 78 | 22 |

It is believed that the present invention operates on the above principle, whereupon the desirable products having di-electric strength and smooth, shiny and nice appearing finishes can now be produced with the higher boiling solvents. This invention is therefore different from the invention of applicant's Patent No. 1,966,094, and in a sense supplements said invention in that it makes possible, with the use of water as the impregnating agent with mineral solvents not usable with water under the principles of that invention.

This invention extends generally to all cold molding operations employing various binders and filling materials, and is restricted only to the use of water as the impregnating agent and the particular class of solvents.

The solvent is removed during the mixing operation, which may be conducted at any suitable temperature. Generally speaking the temperature ranges extend from, approximately, 125° F. up to the boiling point of water. Whereas the benefits of the invention will be realized within the scope of this temperature range, a mixing temperature between 150° F. and 160° F. is much preferred. Below 150° F. the mixing time must be correspondingly prolonged, with the result that below 125° F. the mixing period is so long as to be relatively impracticable from the commercial standpoint. With temperatures appreciably above 160° F. it has been found that certain binders exhibit a tendency to blister when heat-treated after the molding operation, which, of course, is likewise undesirable.

Purely by way of illustration, one preferred method of practicing this invention is as follows:

55 pounds of gilsonite is melted at 500° F. and then cooled to 450° F. Then 37 pounds of a suitable asphalt or a mixture of asphalts of lower melting points are added, for example, 24 pounds of asphalt of a melting point of approximately 180° F. and 13 pounds of asphalt of a melting point of 135° F. The temperature is then raised again to 450° F. at which time 29 pounds of Chinawood oil are added. The temperature is again raised to 450° F. and then allowed to cool.

As above stated, any suitable binding material can be used either alone or in combination. However, oils are always used in combination with some solid binder.

To 130 pounds of the above binder is added 50 pounds of mineral solvent selected from the boiling point range of 300° to 400° F., such as oleum. The mixture of the solid binding materials and the solvent will be hereafter termed "binder". This binder contains 28% of the solvent by weight.

To 135 pounds of asbestos and 15 pounds of whiting, which has been previously placed into a steam jacketed kneading machine, 42 pounds of the above binder are added. This 42 pounds of binder contains approximately 11¾ pounds of solvent. Place a cover over the kneading machine and mix the materials at a temperature of between 150° to 160° F. for forty minutes. During this period of mixing, the solvent cannot escape and hence assists in a rapid covering of the filling material by the binder. Thereafter, remove the cover and add approximately 5 pounds of sulphur as a vulcanizing agent, and 5½ pounds of water (impregnating agent) and continue the mixing for forty minutes.

Inasmuch as the top is now removed, during this forty minute period of mixing, the 5½ pounds of water is driven out as steam or water vapor and carries with it approximately 4.8 pounds of solvent. After this forty minute mixing period without the cover over the mixture, an additional 5½ pounds of water is added which is driven off as steam or vapor and carries with it another 4.8 pounds of solvent.

It is readily understood that toward the latter part of the forty minute mixing period, during which water is expelled, some of the solvent will evaporate so that, as a result, after a total of approximately two hours of mixing, the solvent has been substantially entirely removed. The removal of the solvent creates a heavier mechanical force against the material which accounts for the greater impregnation and the improved finish in di-electric strength of the molded articles.

It is important to note that this procedure would not offer the improved finish, if the mixing temperature and time period were insufficient to vaporize and drive off the water. If the water and solvent remain in the mass a very pasty, soft composition, unsuited for molding would result, and therefore the water must be expelled and carry with it the solvent in order to produce the desired results.

It is understood that a wide variation is possible in the mixing temperature and period, it being fundamental that the lower the temperature, the longer the mixing period required. At a temperature of 200° F. the total treatment may be reduced to approximately one hour. The essential thing is the removal of the water and the consequent removal of substantially all of the solvent carried off with it in accordance with the principles of steam distillation.

This invention is applicable to all cold molding practices involving any of the known binders, solvents and fillers, whether used alone or in combination. As examples of suitable binders may be mentioned: stearine pitch, coal tar pitch, China-wood oil, linseed oil, castor oil, gilsonite, asphalt, cotton seed pitch, fish oil, natural resins, and synthetic resins.

The following are examples of suitable fillers: soft silica, asbestos, whiting, barytes, mica flake, and any other cold molding fillers.

The solvents are any mineral solvents having a boiling point higher than the boiling point of water, but good results are obtained with those having a boiling point between 300° F. and 400° F. V. M. P. naphtha is an example of a solvent within the 200° to 300° Fahrenheit range. Oleum is an example of suitable solvent within the 300° to 400° Fahrenheit range, and kerosene is a suitable solvent selected from between the 400° to 500° Fahrenheit range. This invention, however, is directed to the specified classes of substances and is not to be restricted by the specific examples. The practice with different substances follows the usual and well understood procedure, except for the mixing with water as hereinabove described.

Furthermore, it is to be understood that all of the water may be added at one time instead of by steps. The only limitation in this regard is that sufficient water be added to effect the removal of substantially all of the solvent.

I claim:

1. In the process of producing cold molding compositions, the steps which comprise mixing a suitable binding material, a mineral solvent for said binding material having a boiling point higher than 212° F., a filling material, and water in sufficient quantity to carry off by steam distillation substantially all of said solvent upon said water being vaporized; and continuing said mixing for a period and at a temperature sufficient to eliminate substantially all of said water.

2. The process defined in claim 1, further characterized by conducting the mixing operation at a temperature of between 125° F. and 212° F. until substantially all of the water is eliminated.

3. The process defined in claim 1, further characterized in that the water is added and eliminated in small increments at a time.

4. The process of claim 1, further characterized in that the mixing operation is conducted at a temperature of between substantially 150° F. to 160° F. for a mixing period of approximately two hours.

5. The process of claim 1, further characterized in that the binding material is composed of gilsonite, an asphalt of a melting point approximately 180° F., and asphalt of a melting point approximately 135° F. and China-wood oil and a solvent; and that the filling material is composed of asbestos and whiting and that a quantity of sulphur is used as a vulcanizing agent.

CLARENCE A. HERBST.